United States Patent
O'Brien, III et al.

(10) Patent No.: US 10,891,057 B1
(45) Date of Patent: Jan. 12, 2021

(54) OPTIMIZING FLASH DEVICE WRITE OPERATIONS

(71) Applicant: EMC Corporation, Hopkinton, MA (US)

(72) Inventors: Walter A. O'Brien, III, Westborough, MA (US); Steven A. Morley, Mendon, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/986,616

(22) Filed: Dec. 31, 2015

(51) Int. Cl.
G06F 12/00 (2006.01)
G06F 3/06 (2006.01)

(52) U.S. Cl.
CPC .......... G06F 3/0616 (2013.01); G06F 3/0659 (2013.01); G06F 3/0688 (2013.01)

(58) Field of Classification Search
CPC combination set(s) only.
See application file for complete search history.

(56) References Cited

U.S. PATENT DOCUMENTS

| | | | |
|---|---|---|---|
| 10,013,208 B2* | 7/2018 | Tailliet | G06F 3/061 |
| 10,067,674 B2* | 9/2018 | Kirazci | G06F 3/0604 |
| 2005/0185472 A1* | 8/2005 | Randell | G06F 11/1068 365/185.33 |
| 2006/0106969 A1* | 5/2006 | Hoogerbrugge | G06F 13/1631 711/1 |
| 2008/0126712 A1* | 5/2008 | Mizushima | G06F 11/1415 711/141 |
| 2008/0294836 A1* | 11/2008 | Cheng | G06F 13/4022 711/103 |
| 2008/0320210 A1* | 12/2008 | Kim | G06F 12/0238 711/103 |
| 2013/0246690 A1* | 9/2013 | Haneda | G06F 12/0246 711/103 |
| 2014/0122776 A1* | 5/2014 | El Maghraoui | G06F 12/0246 711/103 |
| 2016/0196180 A1* | 7/2016 | Kim | G06F 3/064 714/764 |
| 2019/0012111 A1* | 1/2019 | Li | G06F 3/0656 |

* cited by examiner

*Primary Examiner* — John A Lane
(74) *Attorney, Agent, or Firm* — Krishnendu Gupta; Dorothy Wu Chiang

(57) ABSTRACT

There is disclosed a technique for use in optimizing write operations for flash devices. A system having a plurality of flash based solid state drives receives a write request to overwrite existing data stored on the solid state drives with new data. The write request data is formatted using a write granularity having a first size and the solid state drives are configured with a write granularity having a second size. Corresponding existing data is retrieved. The new data and the existing data are subdivided into multiple corresponding subunits where each subunit has a size equal to the second size. Each new data subunit is compared with each corresponding existing data subunit to identify which new data subunits include modified data. The new data subunits identified as having modified data are written to corresponding locations on the solid state drives.

19 Claims, 8 Drawing Sheets

OPTIMIZING FLASH DEVICE WRITE OPERATIONS

RELATED APPLICATIONS

This application is related to U.S. patent application Ser. No. 14/986,611, entitled "OPTIMIZING FLASH DRIVE METADATA UPDATE OPERATIONS," filed concurrently herewith on Dec. 31, 2015, which is incorporated herein by reference in its entirety.

TECHNICAL FIELD

The present invention relates to optimizing write operations on flash based solid state drives.

BACKGROUND OF THE INVENTION

Storage devices are employed to store data that are accessed by computer systems.

Examples of basic storage devices include volatile and non-volatile memory, floppy drives, hard disk drives, tape drives, and optical drives. A storage device may be locally attached to an input/output (IO) channel of a computer. For example, a hard disk drive may be connected to a computer's disk controller. A storage device may also be accessible over a network. Examples of such storage devices include network attached storage (NAS) and storage area network (SAN) devices. A storage device may be a single stand-alone component or be comprised of a system of storage devices such as in the case of Redundant Array of Inexpensive Disks (RAID) groups.

A traditional RAID group is a collection of hard disk drives operating together logically as a unified storage device, e.g., to provide some data protection through redundancy. Storage devices with RAID groups are designed to store large quantities of data and typically include one or more storage array processors (SPs), for handling both requests for allocation and IO requests.

Many computing devices now include non-volatile memory (NVM), such as certain magnetic, semiconductor, and/or optical storage media, and may include removable disk systems, hard drives, and other storage media systems allowing the device and/or a user to store data the device uses or is directed to use. The characteristics of non-volatile, vibration-free, small size, and low power consumption have made a type of NVM known as flash memory an excellent component to be utilized in various storage systems. Flash storage devices are widely used as memory storage for computers and consumer system products such as a notebook, desktop computer, set top box, digital camera, mobile phone, PDA and GPS. The increasing demand for more storage in these products has driven the need to expand the capacity of flash storage devices.

Flash memory may also be used in one or more multiple locations in a computer system. For example, computer systems may include different flash memory based resources used by one or more host processors. Such resources and host processors in a computer system may be interconnected by one or more communication connections. These flash memory based resources may include, for example, data storage devices such as those included in the data storage systems manufactured by EMC Corporation. These data storage systems may be coupled to one or more servers or host processors (also known as hosts) and provide storage services to each host processor. Multiple data storage systems from one or more different vendors may be connected and may provide common data storage for one or more host processors in a computer system.

There are at least two types of flash storage devices. A first type has a pre-defined mechanical dimension. This type includes: (a) Secure Digital (SD) card, (b) Multi Media Card (MMC), (c) Memory Stick (MS) card, (d) Compact Flash (CF) card, (e) Express Flash card, (f) Serial Advanced Technology Attachment (ATA) Flash disk, and (g) Small Computer System Interface (SCSI) Flash disk.

A second type of flash storage devices has no pre-defined physical dimension, which includes universal serial bus flash disk (USB), Disk On Module (DOM), and MP3 players. However, based upon the need for the system compactness, it is generally desirable to make this type of flash storage device as small in size and as high in capacity as possible.

Advances in semiconductor technology have led to an increase in the use of semiconductor solid state drives (also known as solid state disks or SSDs), which may use flash memory as a storage device, in areas such as computer systems. Thus, in at least some cases there may be a trend towards the use of SSDs as storage devices instead of, or in addition to, magnetic disks.

An SSD has many features that can make it an attractive storage device. For example, SSDs have a fast access rate, high throughput, a high integration density, and stability against an external impact. SSDs can move large amounts of data and process a large number of IO requests. This allows users to complete data transactions much more quickly.

Furthermore, advances in manufacturing technologies for SSDs may reduce the production costs of SSDs and also increase the storage capacities of SSDs. These developments may provide incentive to use SSDs in place of or in conjunction with magnetic disks in at least some cases.

A flash memory die is the basic element of flash memory. A typical flash memory chip comprises a flash memory die mounted on a substrate within an enclosure and the electrical signals are bonded out to the metal contacts of the package. Two popular package types for flash memory chips are WSOP (Very Very Small Out-line Package) and BGA (Ball Grid Array).

A flash memory die is composed of a number of cells that are used to store data. For instance, a single cell may store one, two, or more bits of data, depending on the design. Cells may be organized into one or more pages and pages may be grouped together to form blocks. For example, a page may contain four kilobytes (KB) of data and a block may contain 128 pages or 512 KB of data.

SUMMARY OF THE INVENTION

There is disclosed a technique for use in optimizing write operations for flash devices. A system having a plurality of flash based solid state drives receives a write request to overwrite existing data stored on the solid state drives with new data. The write request data is formatted using a write granularity having a first size and the solid state drives are configured with a write granularity having a second size. Corresponding existing data is retrieved. The new data and the existing data are subdivided into multiple corresponding subunits where each subunit has a size equal to the second size. Each new data subunit is compared with each corresponding existing data subunit to identify which new data subunits include modified data. The new data subunits identified as having modified data are written to corresponding locations on the solid state drives.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
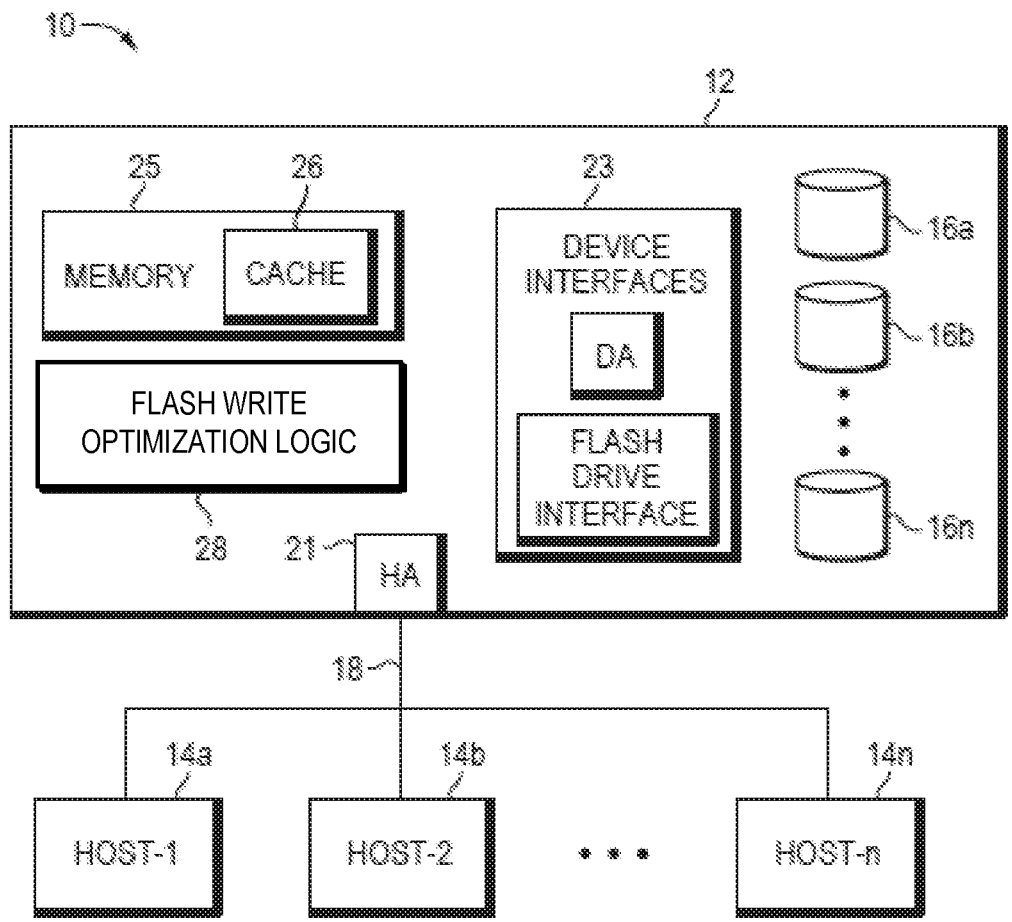
FIG. 1 is an example of a system that may utilize the technique described herein comprising a data storage system connected to host systems through a communication medium.

Data storage systems may include different types of storage devices, such as Flash drives and hard disk drives. Flash drives are typically specified as having an expected lifetime (e.g., as measured in an amount of actual elapsed time such as a number of years or months) based on a number of guaranteed write cycles at a particular rate or frequency at which the writes are performed. Thus, a flash drive may have a specified lifetime rating expressed in calendar or wall clock elapsed time based on the amount of time it takes to perform the number of guaranteed write cycles. SSDs comprising flash memory devices may be referred to herein as flash drives; however SSDs may employ other memory technology such as nonvolatile Random Access Memory (NRAM) and the like.

An SSD may be specified as having a physical size and a logical size. The physical size (also referred to herein as "physical space") or capacity represents the total amount of memory available on the device. The logical size (also referred to herein as "logical space") is the amount memory allocated to a user for storing user data. The remaining amount of space is reserved for data management processes, and may be referred to herein as over-provisioning. For example, physical size may be 256 GB and the logical size may be 200 GB. The remaining 56 GB may be reserved for over-provisioning. In conventional systems, a user may chose an SSD having a particular amount of space reserved for over-provisioning based upon the system design criteria; however, over-provisioning is a static value that cannot be increased or decreased.

Logical to physical size is typically chosen such that the SSD can meet a particular specification, such as a rated lifetime specification based on an expected rate at which the writes will be performed. The allocation of over-provisioning space to logical space may be expressed as a ratio and varies based on intended application taking into account desired endurance and performance characteristics (as used herein, such ratio may be referred to as "over-provisioning ratio" or "allocation ratio"). For example, over-provisioning values may vary from as low as 2-5% for inexpensive consumer applications to upwards of 60-70% for high-performance MLC flash enterprise applications.

Writing data often requires more write operations than the amount of data being written. The number of extra writes required to perform the intended writes may be referred to as write amplification. For example, a 1 MB write may ultimately require 2 MB of actual writes: 1 MB for garbage collection purposes and 1 MB for the actual write request. Thus, in this example, write amplification would be 1:1. The amount of space allocated to over-provisioning can have a significant impact on the write amplification factor, and can vary from slightly more than 1 to 10 times or more.

Increasing the amount of over-provisioning space and/or decreasing the logical size decreases the number of writes required by garbage collection processes as well as reducing write amplification. However, the relationship between over-provisioning and data management work factor is nonlinear. That is, the more over-provisioning space provided, the more the work function decreases; in other words, as over-provisioning increases, the work function decreases at an even higher rate. Conversely, small amount of over-provisioning space will significantly increase the work function.

A flash drive can be queried to determine the drive's effective write rate. Wear rate may be monitored based upon a particular implementation criteria. For instance, wear rates may be monitored hourly, daily, weekly, or monthly as desired based upon operating demand placed on the system. For example, querying a flash drive indicates that it's been written to 10K times after one month of operation. If writes continue at the same rate, the flash drive will be written to 120 K times per year. After five years, a common warranty period, the flash drive will be written to 600 K times. If the flash drive is warranted for say 500 K writes, the flash drive can be expected to fail in less than 5 years which would be within the warranty period, resulting in increased maintenance costs and a dissatisfied customer.

Advantageously, techniques described herein disclose a method to reduce the amount of space allocated for capacity. As a result, less data will be written to the flash drive and write amplification will be reduced thereby reducing the number of writes directed to the flash drive and, consequently, increasing the lifetime.

Conversely, if the method determines that writes are being performed at a much lower rate, say 1K per month, or 12 K per year. If the drive is rated for 500 K writes over its lifetime, and writes continue at this rate, the drive may last over 40 years. In this case, the amount of memory allocated for logical space may be increased, thereby, increasing the rate at which writes are directed to the flash drive. As a result, performance is improved.

Consequently, employing techniques described herein may be used to increase and/or decrease the wear rate for a particular flash drive to control wear rate and improve potential system performance. In this case, the technique may be used to monitor the rate at which writes are directed to a flash drive and if it is determined that the rate is high enough such that the drive may be expected to fail sooner than expected, logical space can be decreased to slow the number of writes directed to the drive and in create the relative amount of over-provisioning space available for data management and storage operations. As a result, the method will slow the rate at which the flash drive wears. If it is determined that the writes are so low such that the expected lifetime of the drive is significantly beyond the intended use, and performance may be improved by increasing the number of writes directed to the flash drive. By continuously monitoring the rate, the amount of memory allocated for logical space may be increased or decreased in order to tailor the wear rate so as to ensure the flash drive lasts as long as intended while providing maximum performance during its lifetime.

Advantageously, the techniques can allow a data storage system to tune the SSD wear rate and performance to a particular workload by dynamically adjusting the wear rate as workloads change. Such changes may occur over time. For example, workloads may increase when the system is first put into production. As applications and data are loaded onto the system and as the system ramps up, it stores more and more data thereby approaching capacity. In this case, it may be desirable to reduce or slow the rate at which data is written to the system. Alternatively, workloads may decrease as new systems are installed. Applications and data may be moved from one or more existing system onto the new system thereby decreasing workloads on the existing system. As the storage system reaches end-of-life applications may continue to be migrated elsewhere thus reducing the wear rate and, in this case, memory allocated for capacity may be increased to provide additional performance boost. In other words, SSDs come with a fixed ratio of logical space to over-provisioning space that implies a particular endurance profile. By dynamically changing the ratio the endurance profile can be changed.

Referring to FIG. 1, shown is an example of an embodiment of a system that may be used in connection with performing one or more implementations of the current techniques described herein. The system 10 includes a data storage system 12 connected to host systems 14a-14n through communication medium 18. In this embodiment of the computer system 10, the n hosts 14a-14n may access the data storage system 12, for example, in performing input/output (IO) operations or data requests. The communication medium 18 may be any one or more of a variety of networks or other type of communication connections as known to those skilled in the art. The communication medium 18 may be a network connection, bus, and/or other type of data link, such as a hardwire, wireless, or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. The communication medium that may be used to provide the different types of connections between the host computer systems and the data storage system of the system 10 may use a variety of different communication protocols such as SCSI, Fibre Channel, PCIe, iSCSI, NFS, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrating the techniques herein, reference may be made to a single data storage array by a vendor, such as by EMC Corporation of Hopkinton, Mass. However, the techniques described herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash memory-based SSDs (also referred to herein as "flash disk drives," "flash storage drives", or "flash drives") are one type of SSD that contains no moving parts.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment. Furthermore, the data storage devices 16a-16n may be connected to one or more controllers (not shown). The controllers may include storage devices associated with the controllers. Communications between the controllers may be conducted via inter-controller connections. Thus, the current techniques described herein may be implemented in conjunction with data storage devices that can be directly connected or indirectly connected through another controller.

Host systems provide data and access control information through channels to the storage systems, and the storage systems may also provide data to the host systems also through the channels. The host systems do not need to address the drives or devices 16a-16n of the storage systems directly, but rather access to data may be provided to one or more host systems from what the host systems view as a plurality of logical devices or logical units (LU). The LUs may or may not correspond to the actual physical devices or drives 16a-16n. For example, one or more LUs may reside on a single physical drive or multiple drives, or a variety of subsets of multiple drives. Data in a single data storage system, such as a single data storage array, may be accessed by multiple hosts allowing the hosts to share the data residing therein.

A map kept by the storage array may associate logical addresses in the host visible LUs with the physical device addresses where the data actually is stored. The map also contains a list of unused slices on the physical devices that are candidates for use when LUs are created or when they expand. The map in some embodiments may also contains other information such as time last access for all or a subset of the slices or frequency counters for the slice; the time last access or frequency counters. This information can be analyzed to derive a temperature of the slices which can indicate the activity level of data at the slice level.

The map, or another similar map, may also be used to store information related to write activity (e.g., erase count) for multiple drives in the storage array. This information can be used to identify drives having high write related wear relative to other drives having a relatively low write related wear.

The data storage system 12 in the embodiment of FIG. 1 further comprises a host adaptor (HA) 21 coupled to the hosts 14a-14n via the communication medium 18, device interfaces 23, memory 25, cache 26, and flash write optimization logic 28. The device interfaces 23 may comprise device adaptors and interfaces (e.g., a flash drive interface). Additionally, the cache 26 may be connectable to the device interfaces 23 if the cache utilizes flash drives in addition to memory.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a VMAX® data storage array and/or VNX® data storage array by EMC Corporation of Hopkinton, Mass. In the foregoing data storage array, the data storage devices 16a-16n may include a combination of disk devices and SSD, such as flash devices, in which the flash devices may appear as standard Fibre Channel (FC) drives to the various software tools used in connection with the data storage array. The disk devices may be any one or more different types of disk devices such as, for example, an ATA disk drive, FC disk drive, and the like.

The flash devices may be constructed using different types of memory technologies such as nonvolatile semiconductor NAND flash memory forming one or more single level cell (SLC) devices and/or multi-level cell (MLC) devices. Additionally, flash memory devices and disk devices are two example types of devices that may be included in a data storage system used in connection with the techniques described herein. Although various example embodiments herein describe flash storage in the context of SLC and MLC flash devices, this is by way of illustration only and should not be construed as being limited as such. For example, other solid state devices such as phase change memory (PCM), single MLC (SMLC), and the like may be similarly implemented.

Thus, the storage system may include a variety of storage devices with different physical and performance characteristics (e.g., types of storage devices, disk speed such as in RPMs), RAID levels and configurations, different replication services (such as particular software used in the data storage system providing data replication), allocation of cache, and processors used to service an IO request. Storage devices with the same or similar characteristics may be grouped into two or more tiers. For example, a group of solid state drives may comprise a fastest tier, a group of fast but small disks may comprise a fast tier, and a group of slow but large disks may comprise a slow tier. It should be noted that in addition to a storage tier, there may be a construct referred to as a storage pool. A storage pool ("pool") may be a reserve of storage devices that may be used, for example, to create LUs, as needed. A pool, as in the case of a storage tier, may be made up of devices with different performance and cost characteristics. Thus, devices within a pool may be partitioned into two or more tiers. In some embodiments, each pool may itself represent a tier. In this embodiment, a pool may be made up of only storage devices with the same or similar characteristics.

In some embodiments, it may also be possible to bind or designate a set of data storage resources, such as logical and/or physical devices, a portion of cache 26, and services, such as a software vendor's service for providing data replication, to one or more of the tiers. The set of resources associated with or designated for use by a tier or grouping within a pool may be characterized as a dynamic binding in that the particular set of data storage system resources associated with a tier may vary from time to time. This binding or association of logical to physical may be kept by making or updating entries in the map. Also, the configuration for the data storage system, aspects of the current data storage system resources (e.g., types of devices, device storage capacity and physical device characteristics related to speed and time to access data stored on the device), and current workload and other dynamic aspects (e.g., actual observed performance and utilization metrics) of the data storage system, may also change over time.

The flash drives may be individually optimized for write longevity via wear leveling. Wear leveling may be characterized as a technique that attempts to arrange or store data on a flash drive where erasures and rewrites are evenly distributed so that no single cell prematurely fails due to a high concentration of writes. Additionally, a data storage array may utilize some techniques in connection with flash drives, other SSDs, and also disks. For example, bad blocks, or other portions of a drive may be mapped out so that once discovered, they are not subsequently used for storing data. Techniques such as wear leveling and mapping out bad blocks or other bad data portions may be used in combination with the techniques described herein in following paragraphs for flash drives to further optimize write longevity.

The techniques herein may be generally used in connection with any type of flash drive in order to ensure that the flash drive lasts a specified lifetime. The flash drive may be, for example, a flash drive which is a NAND gate flash device, NOR gate flash device, flash device that uses SLC or MLC technology. Although various example embodiments herein describe flash storage devices in the singular, such devices may be arranged or configures as multiple devices as is the case with RAID configurations.

Figure 2:
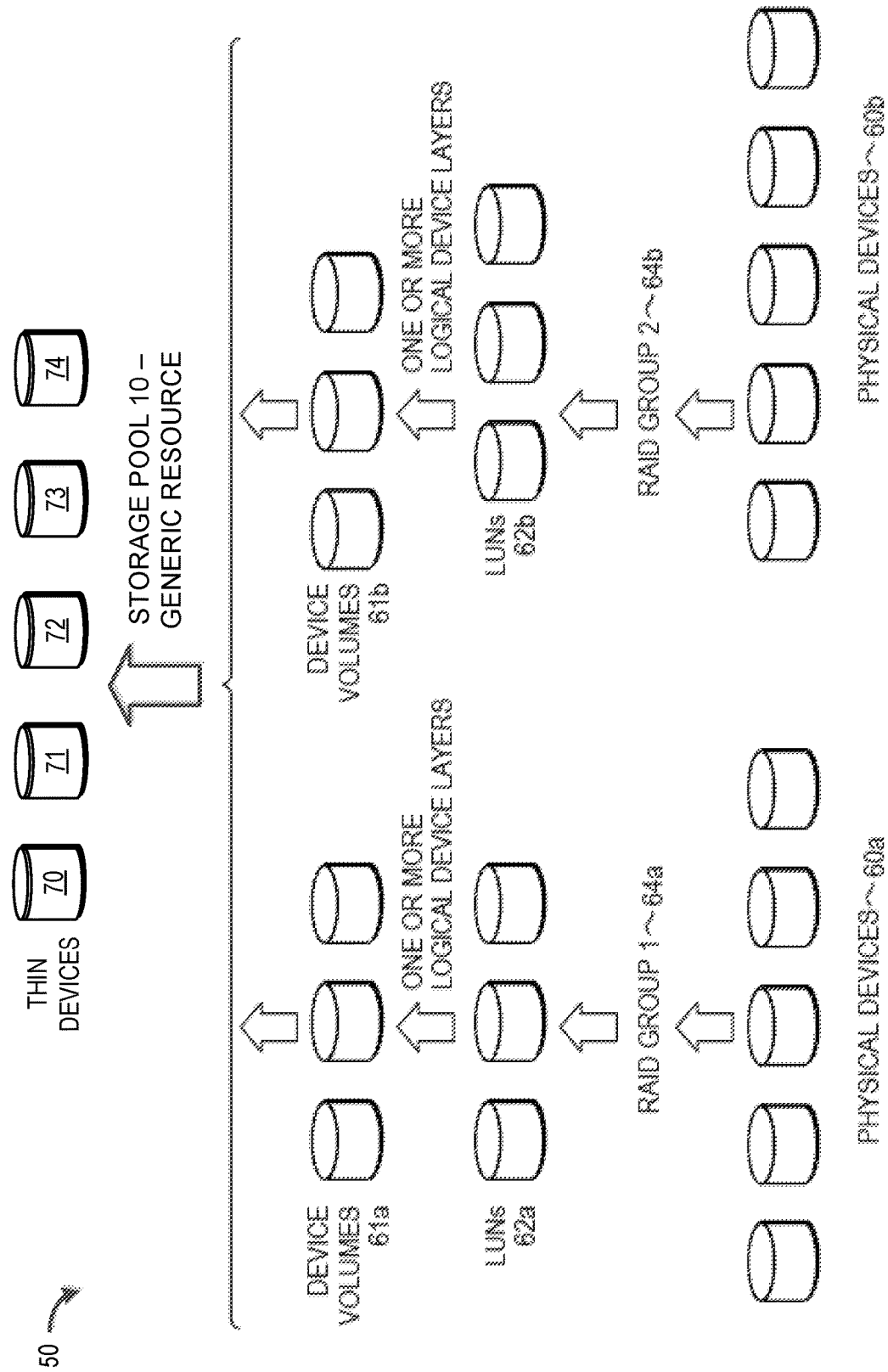
FIG. 2 is an example representation of how storage may be configured from physical devices in an example embodiment.

Referring to FIG. 2, shown is an example representing how storage pools may be represented and implemented in a data storage system. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 10 of the example 50 illustrates two RAID groups being used to define a single storage pool although, more generally, one or more RAID groups may be used for form a storage pool in an embodiment using RAID techniques.

The data storage system 12 may also include one or more thin devices 70-74. A thin device (also referred to as "thin logical unit") presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices such as device volumes 61a-61b, which are logical devices that map logical storage space of the data device to physical storage space on the physical devices 60a-60b. Thus, an access of the logical storage space of the thin device results in either a null pointer (or equivalent) indicating that no corresponding physical storage space has yet been allocated, or results in a reference to a data device which in turn references the underlying physical storage space.

Figure 3:
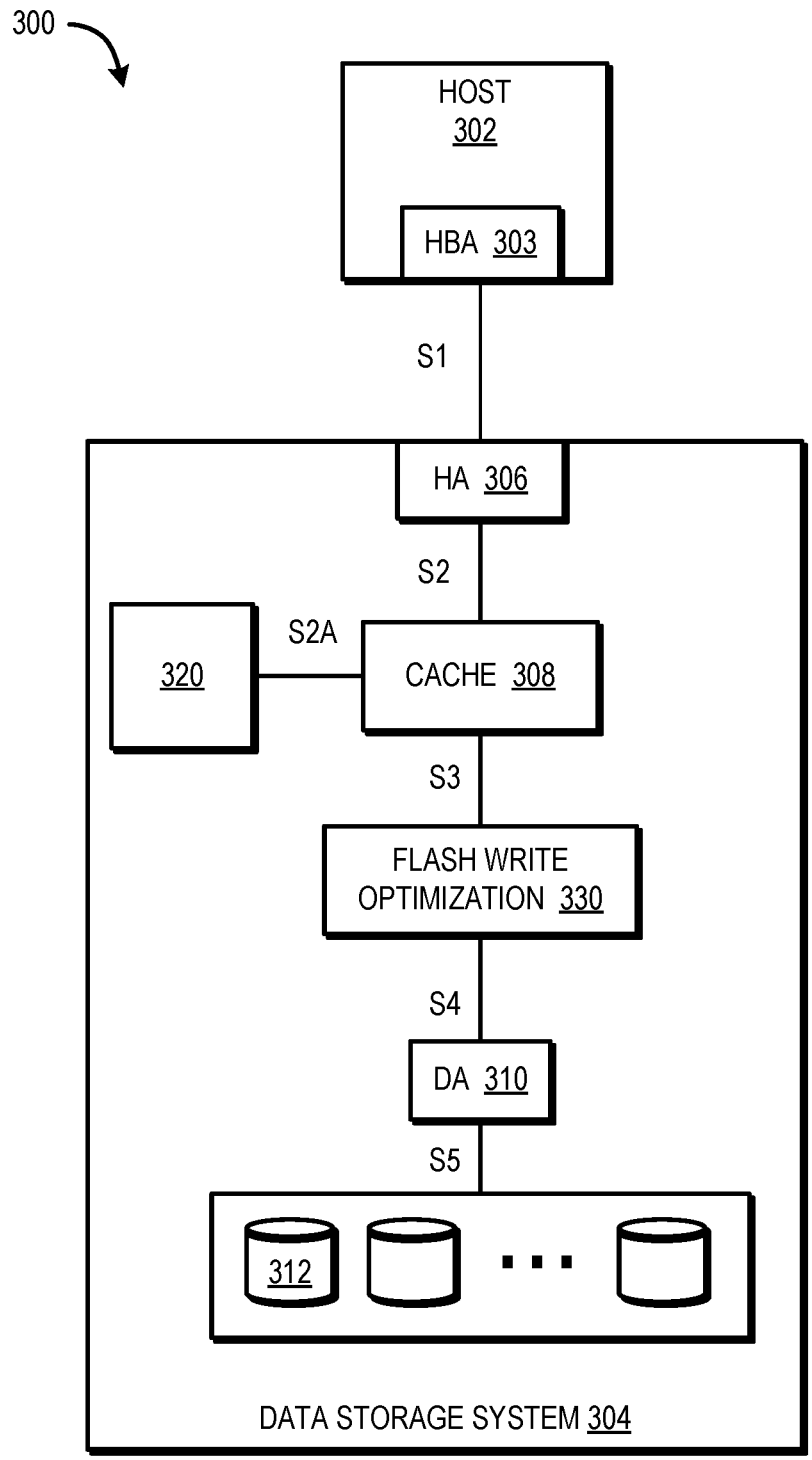
FIG. 3 is a block diagram illustrating an example embodiment in additional detail that may utilize the techniques described herein.

Referring to FIG. 3, shown is an example embodiment illustrating processing of a write IO operation received at the data storage system in an embodiment in accordance with techniques herein, whereby a host may issue the write operation. The example 300 includes host 302 and data storage system 304. The host 302 includes host bus adapter (HBA) 303 having one or more ports used for communicating with the data storage system 304. The data storage system 304 includes a front end component, HA 306, which receives IOs from the host 302. The data storage system 304 also includes cache 308, flash write optimization 330, DA 310, and physical storage device 312, such as one or more SSD devices. Generally, the host 302 and data storage system 304 may include components as described in more detail in connection with other figures herein. Details of other components of 302, 304, and connections between each other, have been omitted for simplicity of illustration. The cache 308 may be a global cache used by and between the different components of the system 304, such as by the HAs, DAs, and other components of the system 304 as described herein. Thus, data in the cache 308 may be read from, and/or written to, by different components of the system 304 such as for use with techniques herein as well as other purposes that may vary with one or more other example embodiments. In one embodiment such as illustrated in the example 300, the cache 308 may be a portion of global memory of the data storage system 304 whereby cache 308 is used as a data cache for data that is read from and/or written to physical storage such as in connection with IO operations received from the host 302 at the data storage system 304. In following paragraphs and illustrated in FIG. 3 is processing performed for a write operation.

In step S1, the host 302 may issue a write request over a port of its HBA 303 where the write request is received by the HA 306 of the data storage system 304. In a step S2, the HA 306 may store the write operation data in cache 308 and mark the cache page or cache location as write pending (WP) thereby denoting the cache page includes write data that needs to be written to physical storage. In some embodiments, the data storage system may return a response to the host indicating that the write operation has been completed successfully following S2 once the write data has been stored in the cache 308. Once the write data has been stored in cache 308 in step S2, processing may be performed at some time later to optimize data writes directed to SSDs whereby such optimization reduces SSD wear rate as will be explained elsewhere in further detail. The write data may then be destages from flash write optimization 330 to the physical drive 312. Thus, in a step S4, the DA 310 may obtain the write data from flash write optimization 330 and then store the write data in step S5 at the appropriate location on the physical SSD device 312. As also described in more detail elsewhere herein, other processing may be performed in connection with processing the write operation such as, for example, providing unmodified data for sub-page size write operations thereby obviating the need the read portion of conventional read-modify-write methods prior to writing data to physical storage in step S5.

In a similar manner with respect to a write operation that originates from a requester, such as a host or application thereon, that is external to the data storage system, an application or other requester 320 that is internal to the data storage system may also originate a write operation whereby, in a step S2A the write operation data is stored in a cache page or cache location of the cache 308 and marked as WP thereby denoting the cache page includes write data that needs to be written to physical storage. Once such write data is stored in cache and marked as WP, processing may be performed at some later time to optimize and destage the cached write data in steps S4-S5 as described above.

Figure 4:
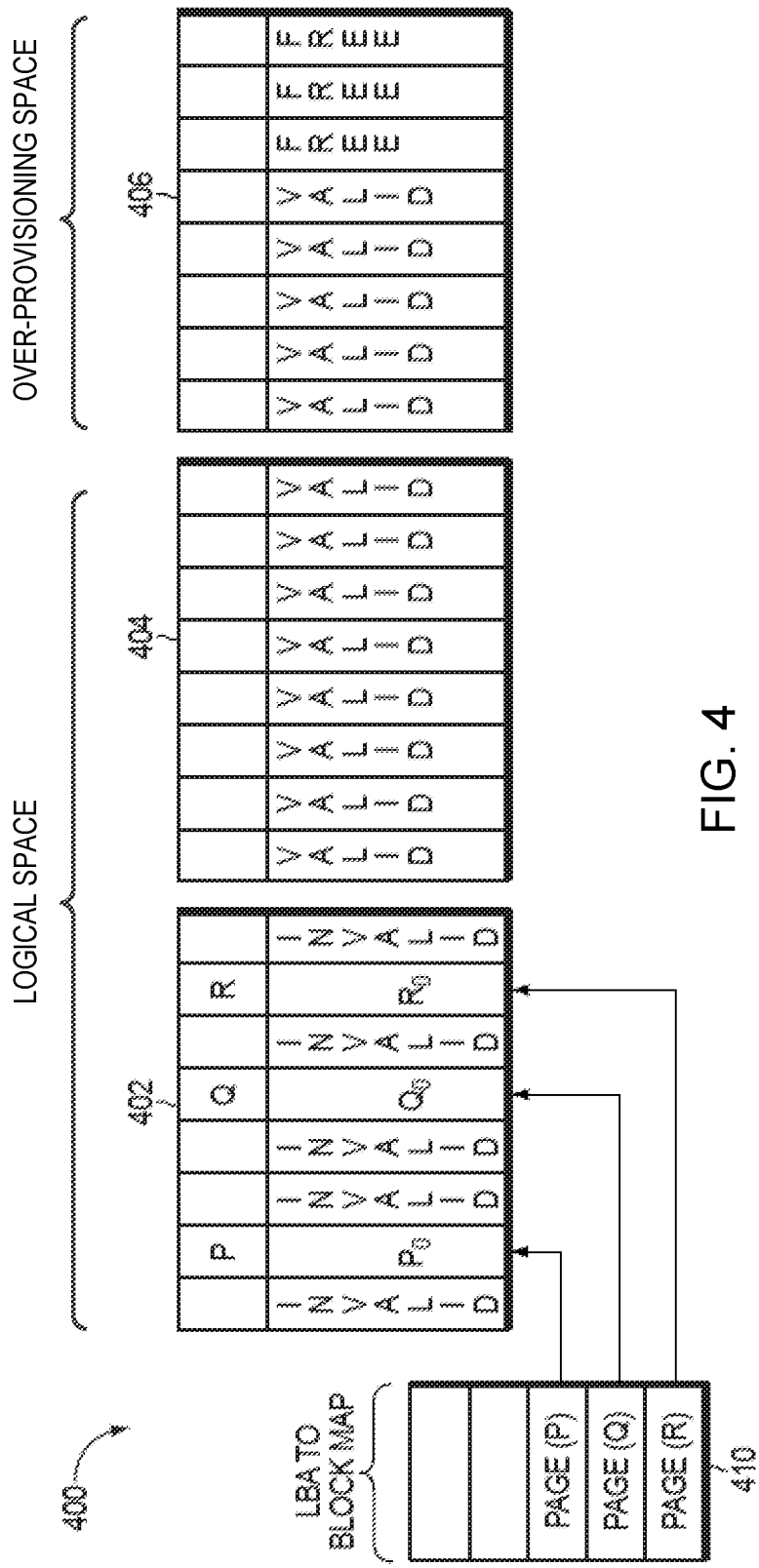
FIG. 4 is an example of a solid state drive (SSD) organized into blocks for storing data.

FIG. 4 depicts a solid state drive (SSD) 400 such as a NAND based flash device organized into blocks (402, 404, 406) for storing data. The blocks may be further subdivided and allocated as logical space blocks 402, 404 and over-provisioning space blocks 406. There is also illustrated a translation layer represented by a map 410 which can be referenced such that data content can be located at a specific location in the blocks (402, 404, 406). It should be understood from the figure that data content P0, Q0 and R0 is located at pages P, Q, and R, respectfully, in the first block 402. However, there is also invalid data at locations in the first block 402 which have no pointer thereto. In other words, the locations comprise data that is not erased but not used either. It should be understood that the second block 404 comprises valid data with pointers (not shown) from the map to the specific locations. The pointers have been omitted for ease of illustration in this figure. It should also be understood that the third block 406 comprises blocks allocated for over-provisioning space and may be used for garbage collection tasks and other housekeeping duties as described herein.

Flash storage may be implemented using one or more SSDs within a data storage system according to techniques described herein. As alluded to above, flash memory is commonly referred to as 'write-once' technology because data cannot be written over directly. Rather, new data writes need to be written to a different page. The existing (also referred to herein as "old") data is marked invalid and indicated as erasable. As flash SSD is exercised, a block may become fragmented in that it may contain multiple valid and invalid pages. A block erase it is necessary to recoup the space previously consumed by pages that have been invalidated. However a block may also include valid pages, thus, it is necessary to copy any valid pages to a different block before erasing the block. The process of copying valid data to a new block prior to block erasure may be referred to as garbage collection.

For example, to recoup invalid pages in block 402, it is necessary to erase the pages first. However, it is not possible to overwrite or erase an individual page P0, Q0, and R0. Rather, it is necessary to erase an entire block such that new data can be written to the block. Thus, if data is to be written from another location to one or more pages in the first block 402, it will be necessary to erase the entire block 402 as it will not be possible to overwrite data in the pages of the first block 402 of the flash device. To enable the new data to be written to the block 402, the valid data P0, Q0 and R0 in the first block 402 is written to free locations in the over-provisioning block 406. Furthermore, the map will be updated such that the pointers point to the new locations in the third block 406 (not shown). This enables the data in the first block 402 to be invalidated and the entire block 402 will be erased after which new data can be written to the newly freed pages in the block 402.

A data storage system implementing flash device storage technology may have multiple layers controlling various data management functions within the storage system. For example, there may be an SSD layer configured to manage data storage related operations associated with the SSD and a cache layer configured to manage data storage related operations associated with storage system cache.

The SSD layer is responsible for maintaining a map of LBAs for data that is stored in the SSD's flash. Pages are used to represent ranges of LBA's, and as noted herein, groups of pages may also be referred to as blocks. Pages are written to in blocks according to the particular SSDs page size granularity and may be, for example, 4 KB in size. The states of a page may include: erased/free, valid, and invalid. The erased/free state represents pages that have been cleared and are available to be written to. The valid state represents a page that has been written to and contains the latest data for the associated LBA range. The invalid state indicates that a page was written to, but a more recent write of data to the same LBA range has occurred and has been placed in another page. Consequently, this page no longer represents information that will be retrieved by a user. A page will remain in this state until the block that contains the page is erased.

The cache layer maintains a map of pages of LBA ranges for data that is stored in the cache. The states of these pages include: invalid/free, valid/clean, and valid/dirty. In the cache layer, typically there is no difference between invalid/free, like there is in the SSD layer. This state represents a page that does not contain any mapped data. The valid/clean state is used to represent a page that is stored in the cache, but there is another copy of this same information in the datastore. The valid/dirty state is used to represent a page that is stored in the cache, but has more recent data than what is in the datastore.

As referenced herein, the lifecycle of a cache page may be described as follows. In an example embodiment, some data D is retrieved from the datastore at a host LBA Y and placed in the cache which, in this example, causes a write of that data to cache LBA X in an SSD. The cache layer will now have an entry in its map that associates host LBA Y to internal Page P. At the cache layer, the map will contain a pointer to SSD LBA X. This entry will be set to Valid/Clean because there is another copy of the same information in the datastore.

The SSD layer will also have a corresponding entry in a table that associates LBA X to a page of flash memory that contains the data P0. This entry will be marked Valid. Now the host writes an update to page P. This will not cause the cache map to change, but will cause the state to change to Valid/Dirty. It also will cause a new write of data to LBA X to the SSD.

At this point, the SSD looks for a free page to write the new data for LBA X. If no free pages are available, a garbage collection cycle (as described herein) will be performed to make the necessary free pages available. Since the data cannot be stored until this step is performed, and the operation must wait for this step to complete, it can affect system operating performance as well as flash lifetime. This process may be referred to herein as a foreground garbage collection cycle. Once the new data is stored, the map is updated to associate LBA X with the new flash location, and the old page location is marked as invalid.

To avoid foreground garbage collection operations, an SSD may choose to run it proactively as a background operation. However, the SSD removes pages that it knows have been invalidated by over-writes. All other pages will be continuously copied to new blocks as the process cycles through all of the flash blocks in the SSD.

The cache layer may independently clean this cache page by updating the datastore with the information in the cache by reading SSD LBA X, writing it to the datastore, and then updating its page state to Valid/Clean. Consequently, changes are not necessary at the SSD level. At the SSD (flash) level, if the flash block that the page that LBA X points to is garbage collected (due to other invalid pages in that block), then, because this page is still considered valid, it will be copied to a new block and its pointers updated.

Within the cache layer, the pages may be arranged according to a particular priority scheme in order to determine which pages to keep in the cache, and which can be discarded when new data needs to be brought into the cache. A variety of cache policy management algorithms for page replacement and cache eviction may be used to populate the cache memory, such as, for example, a least recently used (LRU) (e.g., LRU-K or LRU-2), least frequently used (LFU), least recently/frequently-used (LRFU), adaptive replacement cache (ARC), multiqueue (MQ) replacement, 2Q, low inter-reference recency set (LIRS), and other similar algorithms.

For example, with the LRU algorithm, the cache manager will remove or replace the "least-recently-used" data element in the cache memory. The LRU data element is the usually the oldest data element accessed by a host computer. In order to identify the LRU data element, the cache manager maintains a list or queue of the data elements in the cache memory. The queue is typically implemented as a doubly-linked list. "Forward" and "backward" pointers for this doubly-linked list, for example, are in the cache directory entries, or in the blocks or slots in the cache. When a data element is accessed, the data element is moved to the tail of the queue unless the data element is already at the tail of the queue. If the data element is already in the cache but it is not already at the tail of the queue, it is removed from the queue before being inserted at the tail of the queue. In this fashion, so long as the queue is not empty, the LRU data element in the cache memory will be at the head of the queue, and the most-recently-used data element in the cache memory will be at the tail of the queue.

Conventional data storage systems, and software used therewith, have been optimized for use with HDDs. When writing to HDDs, much of the write time is related to the mechanical nature of the rotating disks and moving heads; the time to actually write data to the device is a small portion of the overall write time. As a result, the time to write a 4 KB vs. 8 KB vs. 16 KB block of data is virtually the same. Consequently, algorithms optimized for use with HDD commonly minimize the number of IO operations by writing larger blocks of data. For example, rather than performing four separate 4 KB write operations, a single 16 KB write operation can be performed in about the same time. Examples include a data storage file system and metadata mapping layer. However, for smaller size writes, this often causes unmodified data to be unnecessarily written to the HDD.

With HDDs having essentially unlimited write endurance and similar write times for small vs. large blocks, unnecessarily writing unmodified data along with small amounts of modified data is of little consequence when compared to the system performance improvements provided by reducing the number in IO commands with larger writes.

As the cost of flash SSDs has decreased, system designers have begun increasingly augmenting or replacing HDDs with SSDs to take advantage of the substantial IO performance improvements inherent with SSD technology. However, unlike the unlimited write endurance with HDDs, SSDs have a finite number of write operations that can be performed by the SSD. Write endurance can be expressed in relation to the number of write cycles flash devices in an SSD can perform before it is effectively worn out and can no longer be written to reliably. Endurance may be specified as, for example, writes per day over some time period (e.g., 100 GB per day over a 5 year period) or as total TB you can write in lifetime of device or other such metric. SSD manufacturers offer devices with varying wear endurance specs where higher endurance devices are generally more costly than lower endurance devices.

As a result, SSDs are not as durable as HDDs when comparing the total number of write commands that can be performed. Furthermore, when SSD are utilized in a conventional HDD optimized system, the additional, unnecessary writes wear out write-limited SSDs more quickly.

Advantageously, current techniques described herein provide a way to optimize SSD writes in HDD optimized systems by reducing the number of writes sent to an SSD. Such techniques can increase the life of an SSD or, alternatively, a less costly, lower endurance SSD can be used while providing similar lifetime performance as compared to conventional methods.

It should be noted that data storage systems are used as a vehicle for describing various example embodiments; however, such discussion should not be construed as a limitation. The SSD write optimization techniques described herein may be similarly applied to other HDD write optimized systems and/or software (e.g., servers, operating systems, databases, applications, etc.) that write to SSDs.

Figure 5:
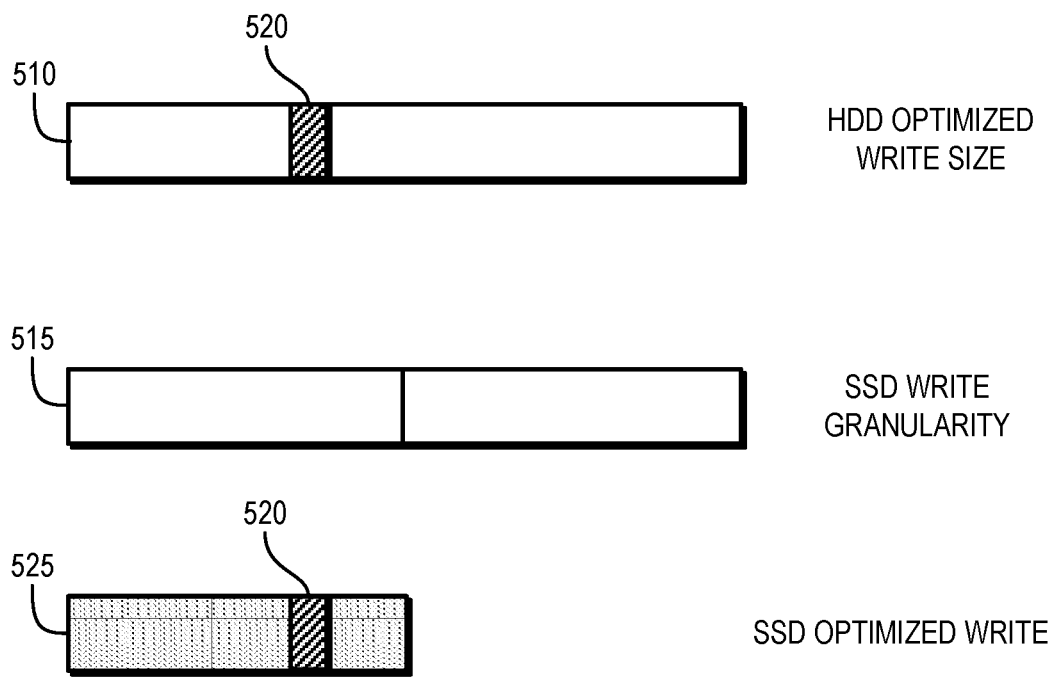
FIG. 5 is a block diagram illustrating an example embodiment that may utilize the techniques described herein.

Referring to FIG. 5, an example embodiment employing the flash SSD user/application data write optimization techniques presented herein is described. Data block or chunk 510 represents an 8 KB HDD optimized write, such as, for example, an 8 KB metadata page in a data storage system. That is, as discussed above, because HDDs can write an 8 KB data chunk in roughly the same time as 4 KB, HDD optimized systems may implement write operations having 8 KB write resolution. Data chunk 515 represents an SSD write where the SSD has a write resolution size of 4 KB. In this example, only a small portion 520 of the 8 KB HDD optimized data chunk 510 was modified and that portion is located within the first 4 KB of the 8 KB chunk. Rather than writing the full 8 KB chunk, the technique will compare the old/existing data (i.e., the data currently stored on the SSD) to the new data (i.e., data in cache that is to be written to the SSD) to determine which 4 KB chunks contain modified data and which chunks do not. The data may be read from disk and an exclusive OR operation may be performed whereby a result of 0 indicates no data has been modified and a result of 1 indicates data was modified. Other mechanisms may be executed to identify modified data such as an OS comparison command and the like.

Here, the technique identifies and determines that the first 4 KB chunk contains modified data 520 and the second 4 KB chunk does not contain any modified data and, therefore, does not need to be written to the SSD. An SSD optimized write is created and executed whereby only the first 4 KB block 525 containing the modified data 520 is written to the SSD. Advantageously, the amount of data bytes written to an SSD is significantly reduced and, as a result, the lifetime of the SSD is considerably extended or, alternatively, may be replaced with a lower cost, lower endurance SSD. Additionally, the current techniques also reduce garbage collection activity thereby further reducing flash write wear.

When a write is received, the system or application (e.g., metadata mapping layer) still functions as is and still writes the same amount of data to cache, for example, 8 KB. The data is received at the mapping layer; however, rather than simply writing the 8 KB to disk, only 4 KB chunks having modified data gets written to the storage array's backend SSD. As a result, new algorithms need only be developed on the storage system's mapping layer rather than for each application.

Figure 6:
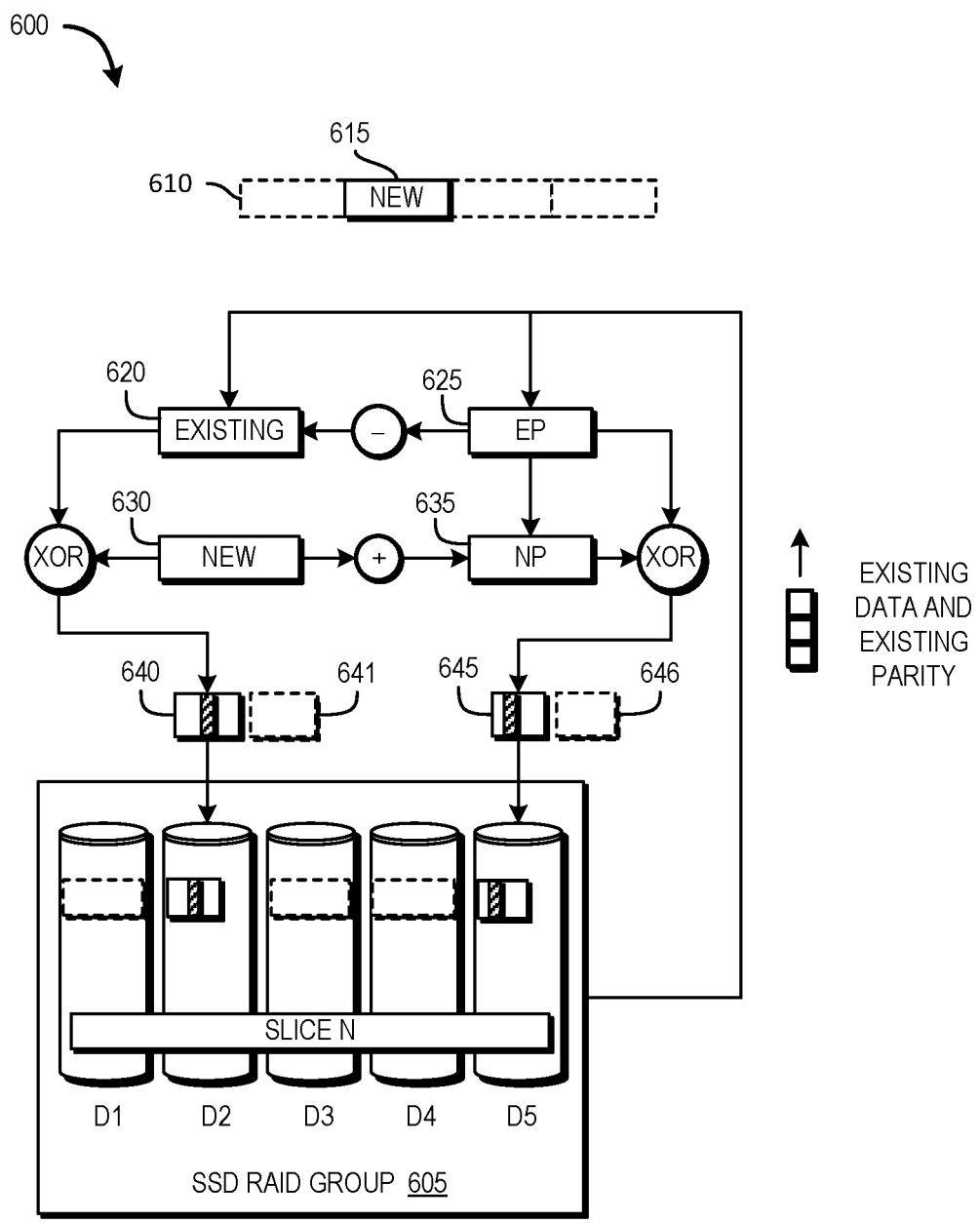
FIG. 6 is a block diagram illustrating an example embodiment depicting a RAID group that may utilize the techniques described herein.

FIG. 6 illustrates an alternative example embodiment 600 whereby the techniques described herein may be further optimized when performing a small block write (i.e., less that a full stripe) within a storage array having SSDs arranged in a RAID configuration. For example, in a 4+1 SSD RAID group 605 configuration, data is typically written as a full data stripe 610 to four drives and parity on the fifth drive. In the case where a 256 KB data stripe 610 is written to the RAID group 605, the first 64 KB chunk is written to the first drive D1, the second 64 KB chunk is written to the second drive D2, the third 64 KB chunk is written to the third drive D3, the fourth 64 KB chunk is written to the fourth drive D4, and the corresponding parity value for the four 64 KB chunks is calculated and written to the fifth drive D5.

Small block 612 writes refer to write operations that are less than a full strip of data, for example, a single 64 KB block 612 write to one of the RAID group drives D2. However, an alternative parity calculation may be implemented so as to calculate a new parity using only the new data. In this way, all the corresponding stripe data does not need to be read to calculate parity data. For example, when the new data 615 is received, the existing data 620 and existing parity (EP) 625 are read from the SSD RAID group 605. The existing data 620 is subtracted from the existing parity 625 value and the then the new data 630 is added to the new parity (NP) data 635 to calculate a new parity value 635 corresponding to the full stripe based on the existing data in D1 and D3-D5 and the new data 630 to be stored in D2.

As described elsewhere herein, current applications and systems designed from HDD optimization typically write data in larger block resolution size than SSD page size resolution. As a result of small block write parity determination, the existing and new data and the existing and new parity values are now stored in local memory (e.g., data storage system cache). With these values, the new data 603 can be analyzed to determine if a smaller sub-section of the new data has been modified and if so, write only that portion and avoid rewriting unmodified data. The new data value 630 may be compared to existing data value 620 by performing, for example, an exclusive OR (XOR) operation using existing and new data values and checking for a 1 (modified data) or 0 (non-modified data). These checks are done for each SSD logical page size chunk in the new data chunk 630. That is, if the new data chunk is 16 KB and the SSD logical page size is 4 KB, each 4 KB chunk is analyzed to determine if modified data is contained therein. Sub-chunks 640 determined to contain modified data are written to the SSD RAID group 605 drive D2 and sub-chunks 641 determined to contain unmodified data may be prevented from being written thereby reducing wear by avoiding unnecessary SSD write operations.

Similarly, new parity data 635 may be compared to existing parity data 625 by performing an XOR operation using existing and new parity data to identify modified and unmodified data for chunks equal to the SSD logical page size. Sub-chunks 645 determined to contain modified data are written to the SSD RAID group 605 parity drive D5 and sub-chunks 646 determined to contain unmodified data may be prevented from being written so as to reduce SSD wear rate.

In this example, because the small block parity calculation reads existing data values and existing parity valued to calculate new parity values, the current technique does not need to perform any extra IO operation to read the existing data. As a result, the technique processing time is reduces and system performance is improved. In other words, the technique leverages RAID reads that are done for small blocks writes to minimize extra effort to determine if a sub stripe block has been modified. It should be noted that the example XOR operation to determine if data has been modified is for explanatory purposes only and should not be construed as a limitation of the techniques as other differentiation methods may be similarly employed, such as compare instructions, and the like.

Figure 7:
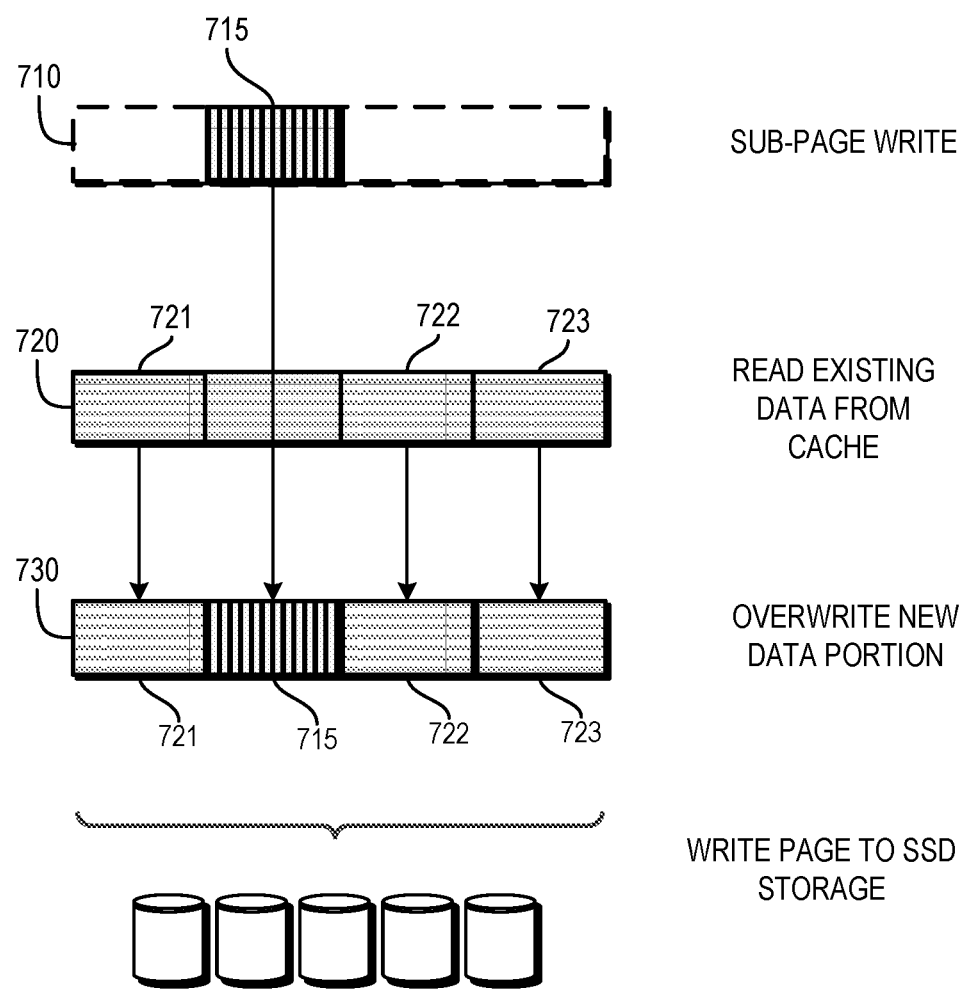
FIG. 7 is a block diagram illustrating an alternative example embodiment that may utilize the techniques described herein.

FIG. 7 illustrates an alternative example embodiment for improving system performance when writing data to an SSD where the size of the data is smaller than the SSD logical page size. An SSD logical page size is determined by the drive manufacturer and represents the size at which data is written to the SSD. If the write data size is less than the SSD's logical page size, a full page still needs to be written to the SSD. When writing modified data to an SSD, the current location is not overwritten, but rather the data is written to a new location and its corresponding pointer in its lookup table is updated to point to the new page location via a "read-modify-write" operation. However, if the write data size is a full logical page size, the entire data chunk is written to the SSD without the need to read-modify data. Consequently, the read-modify-write operation required by data writes less that the SSD logical page size introduces overhead that can reduce overall SSD performance.

A sub-page write 710 to backend SSD storage is depicted where the SSD logical page 710 size is 4 KB and the sub-page write command includes 1 KB of modified data 715. The current techniques can be further modified such that the remaining 3 KB of unmodified data 721, 722, 723 can be read from storage system cache and combined with the 1 KB write data 715 so that a full 4 KB page size write 730 can be executed.

For example, referring to FIGS. 6 and 7, the new 1 KB of data 615, 715 is received at a flash data storage system. The existing data 620, 721, 722, 723 is read from the SSD to compare with the new data 630, 715 with the existing data 620, 721, 722, 723 in order to identify newly modified data (i.e., the 1 KB write). As a result, the page's new modified data 715 and existing unmodified data 721, 722, 723 are available in storage system cache. The modified data 715 and unmodified data 721, 722, 723 can be combined to create a full page 4 KB write that is sent to the SSD where the SSD can write the entire 4 KB data block to a new page via a single write operation. Advantageously, the current techniques can perform sub-page size writes without having to perform a read-modify operation. By contrast, with conventional methods, the SSD would need to perform a costly read-modify-write operation to complete the sub-page write command thereby reducing system performance.

Figure 8:
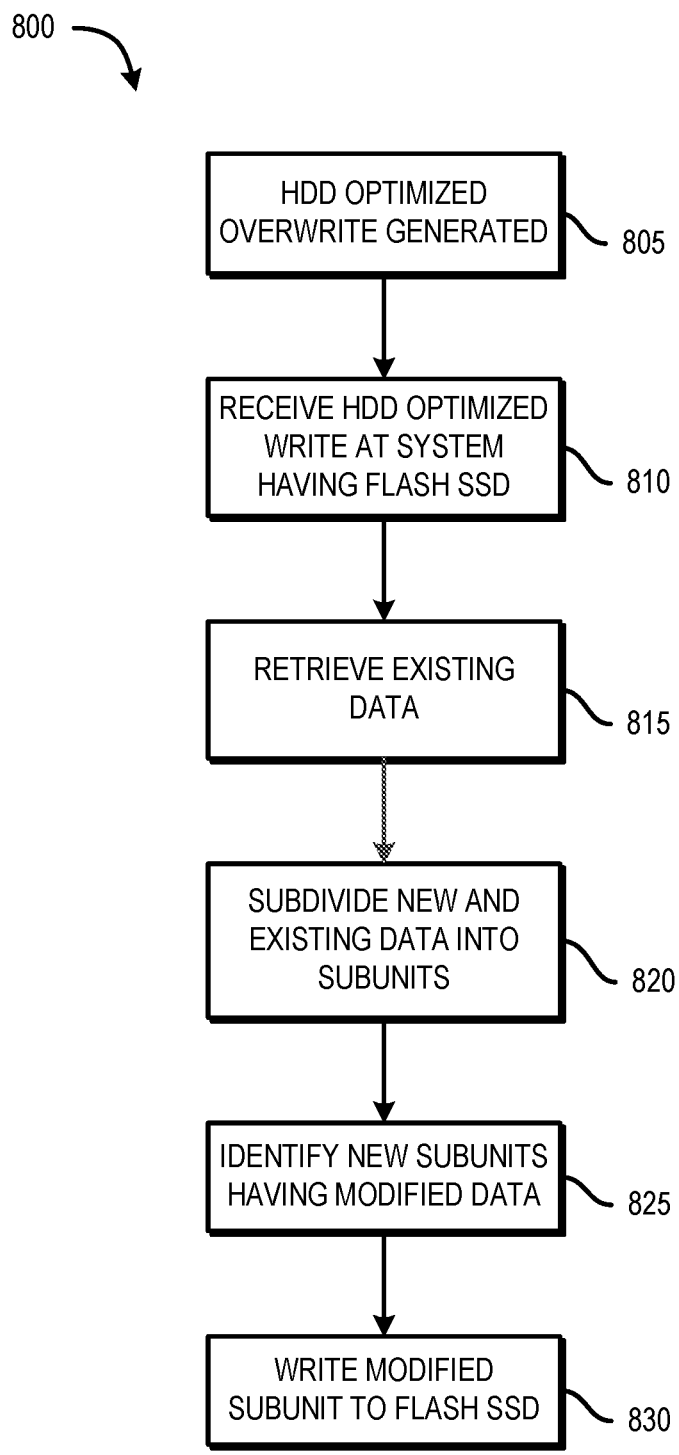
FIG. 8 is a flowchart of the technique performed by the data storage system of FIG. 1.

Referring to FIG. 8, there is illustrated a flow diagram of an exemplary method 800 according to various implementations for use in managing data storage in an SSD based data storage system. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention. The operations may be performed in hardware, or as processor-executable instructions that may be executed by a processor. Furthermore, the method 800 may, but need not necessarily, be implemented using the data storage system of FIG. 1 and may also be implemented, in or in combination with, for example, a server, storage appliance, network device, cloud storage system, software defined storage, or other such implementation comprising flash based SSDs. The SSDs may be constructed using different types of memory technologies such as nonvolatile semiconductor NAND flash memory forming one or more SLC devices and/or MLC devices. The SSDs may be arranged in a RAID configuration in one or more data storage systems. Alternatively, or in addition, flash drives may be configured as a storage tier in the data storage system, wherein the storage tier is one of multiple storage tiers, the multiple storage tiers having progressively better response time characteristics.

At step 805, an HDD optimized write command to overwrite existing data is generated by an application having write commands and algorithms optimized for use with HDDs. As described elsewhere herein, an HDD optimized write may be a write command where larger chunks of data are written in an attempt to reduce the number of IO commands. Such write commands may be generated by applications and/or operating system commands where write commands are sent to a data storage array having SSDs. Although the techniques use a data storage system in various example embodiments, the techniques may be used in other systems having SSDs where the write commands may be sent to, for example, a server or virtualized storage where the flash wear reduction and performance improvements techniques may be similarly applied.

At step 810, the method receives a write request to overwrite existing data that currently stored on an SSD (i.e., an overwrite command). The write request may be generated by an application that has been optimized for HDD writes with a first size granularity (e.g., 8 KB, 16 KB, etc.) in a manner described elsewhere herein. The command may be received and processed by a system having a plurality of SSDs where the SSDs are configured or formatted having a second size write granularity (e.g., 4 KB).

At step 815, the method may retrieve the existing data, that is, retrieve the data that is being overwritten by the write command. The data may be retrieved using a read command to read the existing data into data storage system cache. Alternatively, the data may have been written to cache and may be read therefrom. For example, in the case of a small block write, the existing data was already written to cache as part of the parity calculation as described in conjunction with FIG. 6. In this case, the IO necessary to retrieve the existing data is avoided.

At step 820, the method may subdivide the existing data and new data into subunits that correspond in size to the SSD write granularity. For example, in the case where the HDD write granularity is 16 KB and the SSD granularity is 4 KB, the existing data and write data may be subdivided or segmented into four separate 4 KB subunits aligned with the SSD write granularity.

At step 825, each new data subunit and its corresponding existing data subunit are analyzed to determine whether the particular subunit contains modified data. Thus, in this example, the first 4 KB of new data is compared with the corresponding first 4 KB of existing data to identify if any of the new data is different from the existing data, the second 4 KB of new data is compared with the second 4 KB of new data to determine if any of the new data is different from the existing data, and so on for the corresponding third and fourth 4 KB subunit chunks of new and existing data.

At step 830, any subunits identified as containing modified data are written to the SSDs at the SSDs write granularity size (e.g., 4 KB in this example). Consequently, any new subunits identified as not containing modified data are not written to the SSD, thereby effectively preventing unnecessarily writing that that did not change. As a result, the SSD wear rate can be significantly reduced or, alternatively or in addition, lower cost lower write durability SSDs may be used.

While the above description refers to a data storage system or array having flash based SSD, the techniques may be similarly applied according to alternative embodiments directed to other systems implementing flash based SSDs such as servers, network processors, compute blocks, converged systems, virtualized systems, and the like. Additionally, it should be appreciated that the technique can apply to block, file, object and/or content architectures.

It will be appreciated that an embodiment may implement the technique herein using code executed by a computer processor. For example, an embodiment may implement the technique herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While various embodiments of the present disclosure have been particularly shown and described, it will be understood by those skilled in the art that various changes in form and details may be made therein without departing from the spirit and scope of the present disclosure as defined by the appended claims.

What is claimed is:

1. A method for use in managing data storage, the method comprising:
    receiving, at a system having a plurality of NAND flash memory based solid state drives, a write request to overwrite existing data stored on the solid state drives with new data, wherein the write request is formatted using a first write granularity size corresponding to a hard disk drive write granularity and the solid state drives are configured with a write granularity having a second write granularity size, wherein the first write granularity size is larger than the second write granularity size;
    avoiding overwriting the existing data with the new data using the first write granularity size by:
    reading existing parity data from cache;
    comparing parity data of the new data with the existing parity data from cache to identify which new data subunits in the write request include modified data; and
    writing the new data subunits identified as having modified data to corresponding locations on the solid state drives.

2. The method as claimed in claim 1, wherein a plurality of the solid state drives are configured and arranged as a redundant array of inexpensive disks (RAID) group and data writes are stripped across two or more drives.

3. The method as claimed in claim 2, wherein reading the existing data includes retrieving the existing data and parity data associated with the existing data.

4. The method as claimed in claim 2, wherein reading the existing data includes retrieving the existing data and parity data associated with the existing data by reading the existing data and parity data from SSDs storing the data thereon.

5. The method as claimed in claim 4, further including calculating new parity data associated with the partial block write.

6. The method as claimed in claim 5, wherein calculating the new parity data includes removing the existing partial block write data from the existing parity data and recalculating the parity data using the new data.

7. The method as claimed in claim 6, wherein reading the existing data includes retrieving the existing data and parity data associated with the existing data by reading the existing data and parity data from cache subsequent to recalculating the parity data.

8. The method as claimed in claim 2, wherein the new data is a partial block write.

9. The method as claimed in claim 1, further including:
determining the write data size is less than the second write granularity size;
retrieving existing data;
creating a new write with a write size equal to the second write granularity size, wherein the new write data includes the new data and the remaining write data; and
writing the new write to SSD.

10. A system for use in managing data storage, the system configured to:
receive, at a system having a plurality of NAND flash memory based solid state drives, a write request to overwrite existing data stored on the solid state drives with new data, wherein the write request is formatted using a first write granularity size corresponding to a hard disk drive write granularity and the solid state drives are configured with a write granularity having a second write granularity size, wherein the first write granularity size is larger than the second write granularity size;
avoid overwriting the existing data with the new data using the first write granularity size by:
reading existing parity data from cache;
comparing parity data of the new data with the existing parity data from cache to identify which new data subunits in the write request include modified data; and
writing the new data subunits identified as having modified data to corresponding locations on the solid state drives.

11. The system as claimed in claim 10, wherein a plurality of the solid state drives are configured and arranged as a redundant array of inexpensive disks (RAID) group and data writes are stripped across two or more drives.

12. The system as claimed in claim 11, wherein reading the existing data includes retrieving the existing data and parity data associated with the existing data.

13. The system as claimed in claim 11, wherein reading the existing data includes retrieve the existing data and parity data associated with the existing data by reading the existing data and parity data from SSDs storing the data thereon.

14. The system as claimed in claim 11, wherein the new data is a partial block write.

15. The system as claimed in claim 14, further configured to calculate new parity data associated with the partial block write.

16. The system as claimed in claim 15, wherein calculating the new parity data includes removing the existing partial block write data from the existing parity data and recalculating the parity data using the new data.

17. The system as claimed in claim 16, wherein reading the existing data includes retrieve the existing data and parity data associated with the existing data by reading the existing data and parity data from cache subsequent to recalculating the parity data.

18. The system as claimed in claim 10, further configured to:
determine the write data size is less than the second write granularity size;
retrieve existing data;
create a new write with a write size equal to the second size, wherein the new write data includes the new data and the remaining write data; and
write the new write to SSD.

19. A computer-program product including a non-transitory computer-readable storage medium encoded with computer-program code that, when executed on a processor of a computer, causes the computer to manage data storage in a data storage system, the computer-program product further comprising:
receiving, at a system having a plurality of NAND flash memory based solid state drives, a write request to overwrite existing data stored on the solid state drives with new data, wherein the write request is formatted using a first write granularity size corresponding to a hard disk drive write granularity and the solid state drives are configured with a write granularity having a second write granularity size, wherein the first write granularity size is larger than the second write granularity size;
avoiding overwriting the existing data with the new data using the first write granularity size by:
reading existing parity data from cache;
comparing parity data of the new data with the existing parity data from cache to identify which new data subunits in the write request include modified data; and
writing the new data subunits identified as having modified data to corresponding locations on the solid state drives.

* * * * *